United States Patent
Valente et al.

(10) Patent No.: US 11,924,344 B2
(45) Date of Patent: *Mar. 5, 2024

(54) ACCESS SOVEREIGNTY

(71) Applicant: Google LLC, Mountain View, CA (US)

(72) Inventors: Joseph Valente, Mountain View, CA (US); Nicole Jones, Mountain View, CA (US); David Lee, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,201

(22) Filed: Apr. 14, 2023

(65) Prior Publication Data

US 2023/0254140 A1    Aug. 10, 2023

Related U.S. Application Data

(63) Continuation of application No. 17/652,789, filed on Feb. 28, 2022, now Pat. No. 11,652,624, which is a (Continued)

(51) Int. Cl.
*H04L 9/08*    (2006.01)
*G06F 21/60*    (2013.01)
(Continued)

(52) U.S. Cl.
CPC ............ *H04L 9/088* (2013.01); *G06F 21/602* (2013.01); *G06F 21/645* (2013.01);
(Continued)

(58) Field of Classification Search
CPC ..... H04L 9/088; H04L 9/0866; H04L 9/3213; H04L 9/3228; G06F 21/602; G06F 21/645
See application file for complete search history.

(56) References Cited

U.S. PATENT DOCUMENTS 10,567,492 B1 * 2/2020 Natarajan ........... H04L 63/0807
2012/0324536 A1 * 12/2012 Mcdysan ............ H04L 12/4645
                                                                       709/217
(Continued)

FOREIGN PATENT DOCUMENTS

EP    2544117 A1    1/2013

OTHER PUBLICATIONS

International Search Report and the Written Opinion for the related application PCT/US2019/063021, dated Nov. 25, 2019, 54 pages.

*Primary Examiner* — Ayoub Alata
(74) *Attorney, Agent, or Firm* — Honigman LLP; Brett A. Krueger

(57) ABSTRACT

A method for accessing customer data includes receiving an access request requesting access to customer data stored on a storage abstraction. The access request includes a justification that specifies a purpose/reason for requesting access to the customer data. The method also includes validating the justification, and after validating the justification, transmitting the justification to an external key management service associated with a customer of the customer data. The external key management service is configured to grant or deny access to the customer data based on the justification. The method also includes receiving an approved access token from the external key management service when the external key management service grants access to the customer data and accessing the customer data stored on the storage abstraction using the approved access token received from the external key management service.

20 Claims, 7 Drawing Sheets

Related U.S. Application Data continuation of application No. 16/694,265, filed on Nov. 25, 2019, now Pat. No. 11,277,263.

(60) Provisional application No. 62/895,690, filed on Sep. 4, 2019.

(51) Int. Cl.
*G06F 21/64* (2013.01)
*H04L 9/32* (2006.01)

(52) U.S. Cl.
CPC .......... *H04L 9/0866* (2013.01); *H04L 9/3213* (2013.01); *H04L 9/3228* (2013.01)

(56) References Cited

U.S. PATENT DOCUMENTS

| | | |
|---|---|---|
| 2013/0117563 A1 | 5/2013 | Grabelkovsky |
| 2016/0234215 A1* | 8/2016 | Shankar .................. H04L 63/10 |
| 2020/0412538 A1* | 12/2020 | Rosado ................. H04L 63/126 |

* cited by examiner

Security Policy 200

| Credentials 202 | Justifications 202 |
|---|---|
| - CSP Administrator ................. | Customer_Initiated_Support |
| - Service Binary ................. | CSP_Initiated_System_Operation |
| - Individual ............................ | Read_Data |

FIG. 2

ACCESS SOVEREIGNTY

CROSS REFERENCE TO RELATED APPLICATIONS

This U.S. patent application is a continuation of, and claims priority under 35 U.S.C. § 120 from, U.S. patent application Ser. No. 17/652,789, filed on Feb. 28, 2022, which is a continuation of U.S. patent application Ser. No. 16/694,265, filed on Nov. 25, 2019, now U.S. Pat. No. 11,277,263, which claims priority under 35 U.S.C. § 119(e) to U.S. Provisional Application 62/895,690, filed on Sep. 4, 2019. The disclosures of these prior applications are considered part of the disclosure of this application and are hereby incorporated by reference in their entireties.

TECHNICAL FIELD

This disclosure relates to access sovereignty.

BACKGROUND

Cloud service providers (CSP) offer network services, infrastructure, or business applications in the cloud. The benefit of using a cloud service provider comes in efficiency and economies of scale. Rather than individuals and companies building their own infrastructure to support internal services and applications, these services can be purchased from the CSP providing the services from a shared infrastructure.

The cloud services are typically hosted in a data center that can be accessed by customers using network connectivity. There are several different forms of services that can be used "in the cloud" by CSPs, including software, often referred to as Software as a Service (SaaS), a computing platform for developing or hosting applications, known as Platform as a Service (PaaS), or an entire networking or computing infrastructure, known as Infrastructure as a Service (IaaS). The divisions, however, are not always clear-cut.

SUMMARY

Aspects of this disclosure relate to accessing stored data. One aspect of the disclosure provides a method of granting access to customer data. The method includes receiving, at data processing hardware, an access request requesting access to customer data stored on a storage abstraction in communication with the data processing hardware, the access request including a justification that specifies a purpose/reason for requesting access to the customer data. The method further includes validating, by the data processing hardware, the justification. After validating the justification, the method includes transmitting, by the data processing hardware, the justification to an external key management service associated with a customer of the customer data and in communication with the data processing hardware. The external key management service is configured to grant access to the customer data or deny access to the customer data based on the justification. The method further includes receiving, at the data processing hardware, an approved access token from the external key management service when the external key management service grants access to the customer data, and accessing, by the data processing hardware, the customer data stored on the storage abstraction using the approved access token received from the external key management service.

Implementations of the disclosure may include one or more of the following optional features. In some implementations, the approved access token includes a customer-side cryptographic key or an identifier of the customer-side cryptographic key for accessing the customer data stored on the storage abstraction. Accessing the customer data stored on the storage abstraction may include decrypting the customer data stored on the storage abstraction using the customer-side cryptographic key. In some examples, the approved access token is valid for a predetermined time period. If a current time is outside the predetermined time period, the method may include, in response to receiving the approved access token, rejecting access to the customer data by the data processing hardware.

In some implementations, the received access request further includes credentials associated with a requestor of the access request, the credentials including a user identifier, a group identifier, a service identifier, an access role, or a domain address. Validating the justification may further include validating the credentials of the access request. In some examples, the external key management service includes a list of approved credentials for accessing the customer data stored on the storage abstraction and the external key management service is configured to grant access to the customer data when the credentials of the access request match one of the approved credentials in the list of approved credentials. Validating the justification may include validating a data structure of the justification. The external key management service may be configured to grant access to the customer data when the justification satisfies a security policy associated with the customer data. In some examples, the security policy defines at least one of a list of approved credentials for accessing the customer data stored on the storage abstraction or a list of approved purposes/reasons for accessing the customer data stored on the storage abstraction.

After accessing the customer data stored on the storage abstraction, the method may include transmitting, by the data processing hardware, a result to a client device associated with the customer of the customer data, the result informing the customer that the customer data was accessed. In some implementations, the data processing hardware is prevented from accessing the customer data without the approved access token. The external key management service may execute on a remote client device associated with the customer of the customer data and in communication with the data processing hardware.

Another aspect of the disclosure provides a system for granting access to customer data. The system includes data processing hardware and memory hardware in communication with the data processing hardware. The memory hardware stores instructions that when executed on the data processing hardware cause the data processing hardware to perform operations. The operations include receiving an access request requesting access to customer data stored on a storage abstraction in communication with the data processing hardware, the access request including a justification that specifies a purpose/reason for requesting access to the customer data. The operations further include validating the justification. After validating the justification, the operations include transmitting the justification to an external key management service associated with a customer of the customer data and in communication with the data processing hardware. Based on the justification, the external key management service is configured to grant access to the customer data or deny access to the customer data. The operations further include receiving an approved access token from the external key management service when the external key management service grants access to the customer data, and accessing the customer data stored on the storage abstraction using the approved access token received from the external key management service.

Implementations of the disclosure may include one or more of the following optional features. In some implementations, the approved access token includes a customer-side cryptographic key or an identifier of the customer-side cryptographic key for accessing the customer data stored on the storage abstraction. Accessing the customer data stored on the storage abstraction may include decrypting the customer data stored on the storage abstraction using the customer-side cryptographic key. In some examples, the approved access token is valid for a predetermined time period. If a current time is outside the predetermined time period, the operations may include, in response to receiving the approved access token, rejecting access to the customer data by the data processing hardware.

In some implementations, the received access request further includes credentials associated with a requestor of the access request, the credentials including a user identifier, a group identifier, a service identifier, an access role, or a domain address. Validating the justification may further include validating the credentials of the access request. In some examples, the external key management service includes a list of approved credentials for accessing the customer data stored on the storage abstraction and the external key management service is configured to grant access to the customer data when the credentials of the access request match one of the approved credentials in the list of approved credentials. Validating the justification may include validating a data structure of the justification. The external key management service may be configured to grant access to the customer data when the justification satisfies a security policy associated with the customer data. In some examples, the security policy defines at least one of a list of approved credentials for accessing the customer data stored on the storage abstraction or a list of approved purposes/reasons for accessing the customer data stored on the storage abstraction.

After accessing the customer data stored on the storage abstraction, the operations may include transmitting a result to a client device associated with the customer of the customer data, the result informing the customer that the customer data was accessed. In some implementations, the data processing hardware is prevented from accessing the customer data without the approved access token. The external key management service may execute on a remote client device associated with the customer of the customer data and in communication with the data processing hardware.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2 is a schematic view of an example security policy.

Like reference symbols in the various drawings indicate like elements.

DETAILED DESCRIPTION

Figure 1:
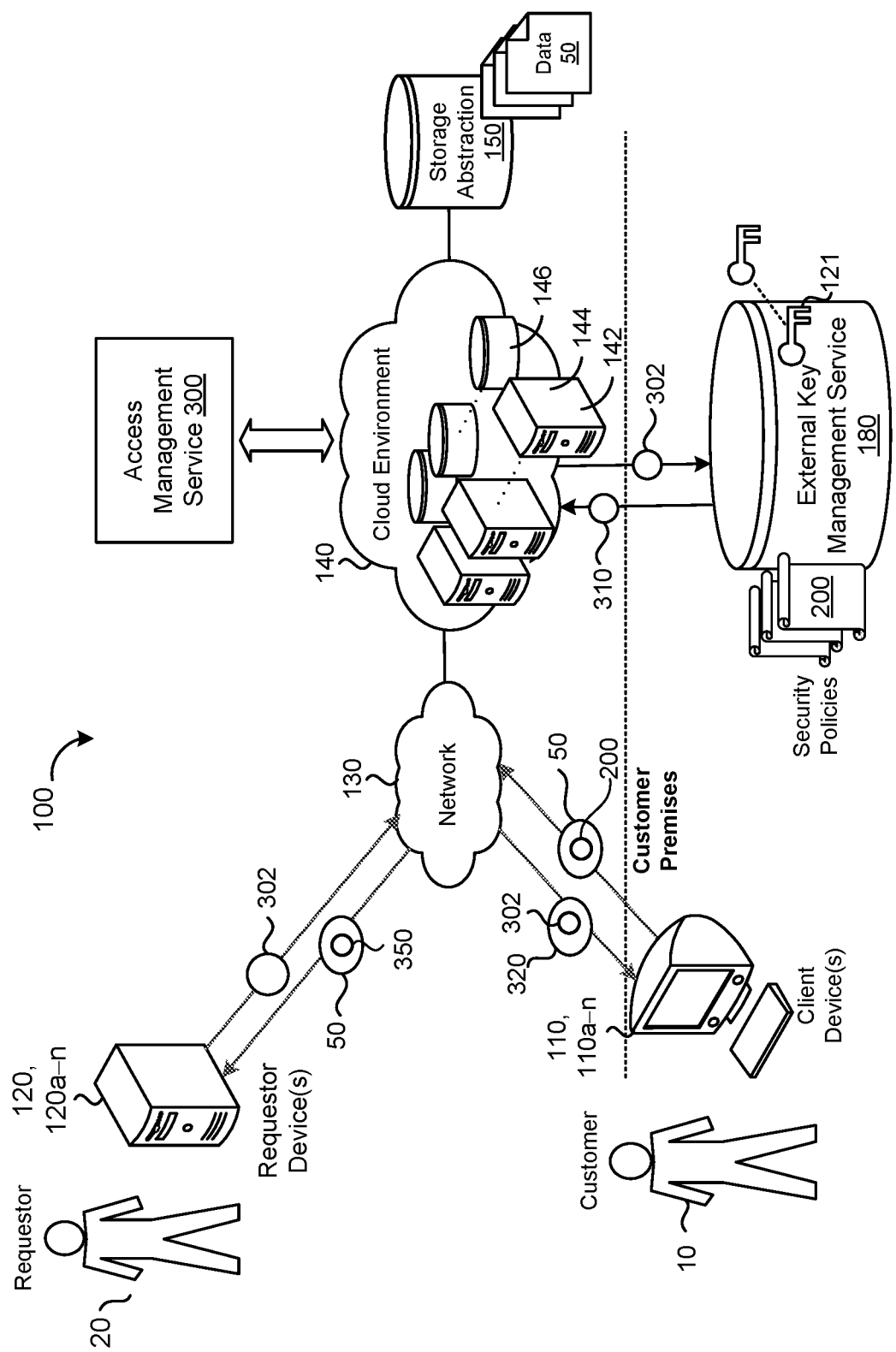
FIG. 1 is a schematic view of an example system for managing access to customer data stored on a storage abstraction.

Cloud service providers (CSPs) may offer multiple flavors of cloud services, including traditional web or application hosting providers. For example, a CSP may start as a web hosting company then offer either Platform as a Service (PaaS), Software as a Service (SaaS), and/or Infrastructure as a Service (IaaS) services later. Many CSPs focus on specific vertical markets, such as hosting healthcare applications in a secure IaaS computing system.

Distributed (cloud) data storage is a model of computer data storage in which the digital data is stored in logical pools. The physical storage may span multiple servers (sometimes in multiple locations), and the physical environment is typically owned and managed by a hosting company (e.g., a CSP). These cloud storage providers are responsible for keeping the data available and accessible to authorized users, and the physical environment protected and running. People and organizations buy or lease storage capacity from the providers to store user, organization, or application data.

Cloud storage services may be accessed through a co-located cloud computing service, a web service application-programming interface (API), or by applications that utilize the API, such as cloud desktop storage, a cloud storage gateway or Web-based content management systems. Distributed storage systems may be hosted in one or more data centers owned and managed by hosting companies or CSPs. In this case, the hosting companies are responsible for keeping the physical environment protected and running. Hosted distributed storage systems may be used for a variety of reasons, including lower costs compared to building proprietary infrastructure, increased reliability, and the ability to flexibly scale up or down as customer needs evolve. Distributed storage systems may store customer data and make customer data accessible, e.g., using network connectivity, to authorized users. The distributed storage system may store data from multiple customers and provide services to the multiple customers using shared infrastructure. In this case, the CSP may provide safeguards against exfiltration of data from one customer to another customer in the shared infrastructure. For instance, each customer's service may operate in a virtual machine (VM) environment, container environment, or other form of "silo" providing a secure execution environment to isolate customer data. As such, "customer data" may refer to data/contents of a customer stored on a storage abstraction, as well as contents (e.g., code/instructions) for software/services belonging to the customer that execute in secure execution environments hosted by the CSP.

In some examples, a storage abstraction residing on a distributed storage system and/or an on-premises data store is dedicated to one customer and managed by a CSP, in which the CSP provides specific assurances and safeguards that no personal of the CSP or a third party is able to access the customer data without express consent from the customer. For instance, administrators, or other authorized personal, of a CSP may have access roles that may include inspecting contents of customer data stored on a storage abstraction (e.g., a distributed storage abstraction or on-premises storage) hosted/managed by the CSP from time to time in order to inspect code, scan for malware, perform debugging, or perform other maintenance or operations on the system. In additional scenarios, CSPs may be requested by government agencies or law enforcement to provide access to certain customer data stored on storage abstractions managed by the CSPs. In these scenarios, any time an individual or entity other than the customer needs access to the customer data stored on the storage abstraction, the individual or entity needs to provide an access request to the customer that the customer must approve (or pre-approve) before providing a customer-side (e.g., customer-controlled) cryptographic key required for accessing the customer data. For instance, only the customer may provide access to the required cryptographic key that the requesting party uses to decrypt the customer data stored on the storage abstraction.

Some customer data may be sensitive. For instance, customer data may include data governed by privacy laws, such as the Health Insurance Portability and Accountability Act (HIPAA), or General Data Protection Regulation (GDPR). Customer data may contain trade secrets or other data that could materially damage the customer's business or reputation if made public. Customer data, whether sensitive or not, may be stored in encrypted form and requiring a cryptographic key to decrypt the customer data in plaintext. In some examples, access to customer data is authorized by an external key management service. The external key management service may be managed by the customer and may reside on the premises of the customer. In some examples, the customer-managed external key management service provides access keys (e.g., cryptographic keys) in response to requests from approved requestors for authorized purposes. As the customer data stored on the storage abstraction is encrypted, and thus inaccessible without a cryptographic key, the customer may exclusively control how cryptographic keys required for accessing the customer data are accessed from the external key management system. The external key management service may reside on the customer premises or at some other location isolated/independent from the storage abstraction managed by the CSP and containing the customer data. Here, the external key management service may manage client-side cryptographic keys that include customer-managed encryption keys (CMEKs).

In some implementations, each request to access customer data encrypted with a CMEK, includes a justification that specifies a purpose/reason for requesting access to the customer data that the external key management service associated with the customer must approve in order to provide the corresponding CMEK for accessing (e.g., decrypting) the requested customer data. The customer may set up a security policy for the external key management service that pre-approves credentials for specific requestors (e.g., administrators of the CSP) and justifications specifying approved purposes/reasons (e.g., actions) for accessing the customer data that the customer permits. As such, the external key management service will grant access to customer data when a corresponding access request includes credentials of the requestor that match a specific requestor in the security policy and a justification that matches a specific purpose reason in the security policy. Similarly, if the access request does not satisfy the security policy, the external key management system will not provide the corresponding CMEK for accessing the requested customer data, thereby preventing the requestor access to the requested customer data. In some examples, an access request that does not satisfy the security policy is then forwarded to the customer for having the final say for granting/denying access to the requested customer data. As such, the CSP may include infrastructure (e.g., access management service) that communicates with the external key management service by serving access requests for customer data for approval by the external key management service. In turn, the customer may receive a result (e.g., adjust log) of each access request (e.g., the requestor, the requested customer data, etc.) indicating whether or not the external key management service granted or denied access to the access request.

In some examples, for each access request received from a requestor, the CSP (e.g., using the access management service) may first validate the access request (e.g., credentials and/or justification) before forwarding or relaying the justification to the external key management service. In this way, customers may have increased confidence that the access request is initially authorized/authenticated by the CSP before acting as the final arbitrator to grant/deny access to customer data specified in the access request. In some examples, the CSP may provide assurances, such as legal assurances, guarantees, or indemnification for access requests deemed valid to further increase customer confidence that access to customer data is protected. For example, the CSP may enforce a chain of custody of requestors to preserve the integrity of the justification relayed, forwarded, or transmitted from one software application to another software application. The CSP may provide results that include auditable logs of data access requests to the customer.

Referring to FIG. 1, in some implementations, a system 100 includes one or more client devices 110, 110a-n associated with a customer 10, who may communicate, via a network 130, with a remote system 140. The system 100 also includes one or more requestor devices 120, 120a-n associated with a requestor 20, who may communicate, via the network 130, with the remote system 140. The remote system 140 may be a distributed system (e.g., cloud environment) having scalable/elastic resources 142. The resources 142 include computing resources 144 (e.g., data processing hardware) and/or storage resources 146 (e.g., memory hardware). A storage abstraction 150 (e.g., key/value store, file system, data store, etc.) may be overlain on the storage resources 148 to allow scalable use of the storage sources 148 for storing customer data 50 associated with the customer 10 (e.g., the customer 10 owns the customer data 50). In some implementations, the computing resources 144 execute an access management service (AMS) 300 that manages access to the customer data 50 stored on the storage abstraction 150. For instance, the client device 110 may encrypt and store customer data 50 on the storage abstraction 150, as well as retrieve and decrypt the customer data 50 from the storage abstraction 150. As will become apparent, the AMS 300 is unable/restricted from freely accessing and decrypting customer data 50 stored on the storage abstraction 150.

The memory hardware 146 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), oblivious random access memory (ORAM), dynamic random access memory (DRAM), static random access memory (SRAM), phase change memory (PCM) as well as disks or tapes.

The network 130 may include various types of networks, such as local area network (LAN), wide area network (WAN), and/or the Internet. Although the network 130 may represent a long range network (e.g., Internet or WAN), in some implementations, the network 130 includes a shorter range network, such as a local area network (LAN). In some implementations, the network 130 uses standard communications technologies and/or protocols. Thus, the network 130 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 130 uses custom and/or dedicated data communications technologies instead of, or in addition to, the ones described above.

The remote system 140 may be associated with a provider (e.g., cloud service provider (CSP)) that owns and/or manages the resources 142 of the remote system 140. The CSP may allow customers 10 to store customer data 50 on the storage abstraction 150 and/or execute software services on the resources 142 for the customers 10. Generally, the CSP is responsible for keeping the customer data 50 available and accessible to authorized users, while ensuring operation of the resources 142 in the physical environment. As such, customers 10 may include individuals or entities (e.g., organizations) that buy or lease storage capacity and/or computing resources from the CSP to store and/or execute data 50 associated with the individual user or entity. While the example shown depicts the storage abstraction 150 associated with the remote system 140, at least a portion of the storage abstraction 150 may alternatively be implemented on premises of the customer 10 via an intranet having client devices 110 and on premises data storage. For instance, the storage abstraction 150 may include storage locations located on the premises of the customer 10 and/or located on some other external system managed by a third party (e.g., another CSP). As such, the storage abstraction 150 may include any combination of storage locations residing on the remote system 140, the premises of the customer, or one or more other external systems.

The client devices 110 and the requestor devices 120 can be any computing devices that are capable of communicating with the AMS 300 through the network 130. The client and requestor devices 110, 120, respectively, include, but are not limited to, desktop computing devices and mobile computing devices, such as laptops, tablets, smart phones, smart speakers/displays/appliances, and wearable computing devices (e.g., headsets and/or watches). The requestor devices 120 may correspond to a requestor 20 that may include an administrator of the remote system 140 (e.g., an employee of a CSP providing the remote system 140), a third party user/entity such as law enforcement or government agency, or one or more software applications requiring access to the customer data 50 stored on the storage abstraction.

The client devices 110 may correspond to customers 10 of the remote system 140 that store their data 50 on the storage abstraction 150 and/or deploy and/or access software applications executing on the remote system 140. Here, the customer data 50 may include sequences of instructions and/or program state information stored on the storage abstraction 150 for use by the computing resources 142 in executing software applications deployed and/or accessed by a customer 10. The resources 142 may provide virtual machines and/or containers for executing software applications deployed by the customer 10 in secure execution environments. In some scenarios, the customer data 50 includes any data (e.g., source code, instructions, program state information, etc.) used by virtual machines and/or containers deployed for use by the customer 10. Such, secure software execution environments may include an Enterprise Container Platform. Configuring the Enterprise Container Platform may include copying customer data 50 into containerized applications.

Customer data 50 stored on the storage abstraction 150 may be sensitive in nature and may be modified, updated, or may otherwise change over time. For example, customer data 50 may include business transaction information that updates after each transaction. Business transaction information may include inventory records, sales information, employee records, medical records, etc. In some examples, customer data 50 stored on the storage abstraction 150 persists unchanged for relatively long periods of time. For example, customer data 50 may include computer backup files, computer configuration information, or other data.

In the example shown, the customer 10 encrypts the customer data 50 using a client-side cryptographic key 121 and stores the encrypted customer data 50 on the storage abstraction 150. Additionally, the customer 10 may define a security policy 200 associated with the customer data 50 stored on the storage abstraction 150. For instance, the customer 10 via the client device 110 may provide an Identity and Access Management (IAM) policy to the AMS 300, whereby the IAM policy defines the security policy 200 indicating "who can do what to which thing" in which "who" includes credentials 202 (FIG. 2) identifying specific users/entities/applications, and "which thing" identifies resources 142 hosting customer data 50, and "what" includes justifications 204 (FIG. 2) assigned to the credentials 202 for granting access to the customer data 50. FIG. 2 shows an example security policy 200 associated with customer data 50 stored on the storage abstraction 150. The credentials 202 may include, without limitation, individual identifiers, group identifiers, service identifiers, access roles, and domain addresses for software applications. In the example shown, the security policy 200 includes credentials 202 identifying an Administrator of the CSP, credentials 202 identifying a Service Binary (e.g., source code for a software application), and a credentials 202 identifying a specific individual. The justification 204 associated with the CSP administrator includes "Customer_Initiated_Support" that specifies that the security policy 200 will grant the CSP administrator specified by the credentials 202 access to the customer data 50 for the purpose/reason of performing a customer initiated support operation requiring access to the customer data 50. The justification 204 associated with the Service Binary includes "CSP_Initiated_System_Operation" that specifies that the security policy 200 will grant the Service Binary specified by the credentials 202 access to the customer data 50 when the Service Binary is performing a CSP-initiated system operation (e.g., maintenance, debugging, etc.) that requires access to the customer data 50. The justification 204 associated with the specific individual includes "Read_Data" that specifies that the security policy 200 will grant the specific individual specified by the credentials 202 read access to the customer data. For instance, the customer 10 defining the security policy 200 may include a health provider (e.g., hospital system) and the specific individual identified in the security policy 200 may be a patient permitted to access his/her medical record stored as the encrypted customer data 50. The security policy 200 may correspond to a security context when the customer data 50 is associated with a container executing a software application deployed by the customer 10 in a secure execution environment. Here, the security context may define privileges and access control settings for the container such as permissions to access an object/file based on user identifier and group identifier credentials.

An administrator of the CSP may be responsible for ensuring that the storage abstraction 150 is used consistently with relevant compliance regimes (for example, anti-money-laundering regulations). The administrator may also be responsible for investigating complaints or other signals of abusive activity by the customer 140. Accordingly, the administrator may act as a requestor 20 and use the requestor device 120 to send an access request 302 requesting access to the customer data 50 stored on the storage abstraction 150 to scan the customer data 50 for malware, scan that the customer data 50 is compliant with relevant compliance regimes, or to investigate complaints regarding abusive activity by the customer 10. In some scenarios, the requestor 20 may correspond to the customer 10 of the requested customer data 50.

In some examples, the client device 110 executes a graphical user interface that allows the customer 10 to define a security policy 200 associated with customer data 50 stored on the storage abstraction 150. Initially, the graphical user interface may populate a list of common credentials 202 and associated justifications 204 received from the AMS 300. Here, the common credentials 202 and associated justifications 204 include credentials 202 and justifications 204 that the AMS 300 anticipates will likely be included in access requests 302 for accessing customer data 120. For instance, some common credentials 202 may include specific CSP administrator access roles assigned with justifications 204 to access the customer data 50 for inspecting code, scan for malware, perform debugging, or perform other maintenance or operations on the system. Using the graphical user interface executing on the client device 110, the customer 10 may select/enable some or all of the common credentials 202 and associated justifications 204 for inclusion in the security policy 200 associated with the customer data 50. Further, the graphical user interface may allow the customer 10 to manage and update the security policy 200 at any time. For instance, the customer 10 may add/remove credentials and justifications 202, 204 to/from the security policy 200 at anytime.

Referring back to FIG. 1, a requestor device 120 may transmit an access request 302 to the AMS 300 requesting access to customer data 50 stored on the storage abstraction 150. Each access request 302 includes a corresponding justification 204 that specifies a purpose/reason for requesting access to the customer data 50. In some examples, each access request 302 also includes credentials 202 identifying the requestor 20 associated with the requestor device 120 of the access request 302. In the example shown, an external key management service 180 associated with the customer 10 is configured to hold/store/manage the client-side cryptographic key 121 used to decrypt/encrypt the customer data 50. As such, the client-side cryptographic key 121 used to encrypt the customer data 120 requested by the requestor device 10 in the access request 302 is managed by, or otherwise under the control of, the customer 120 and inaccessible to the AMS 300 or the requestor device 120 unless the external key management service 180 grants access to the key 121 for accessing the customer data 50. Accordingly, without the client-side cryptographic key 121, the AMS 300 is unable to service the received access request 302 because the AMS 300 cannot decrypt the customer data 50 stored on the storage abstraction 150.

In the example shown, to obtain the client-side cryptographic key 121, the AMS 300 forwards the access request 302 to the external key management service 180 and the external key management service 180 is configured to one of grant access to the key 121 (and thereby grant access to the requested customer data 50) or deny access to the key 121 (and thereby prevent access to the requested customer data 50). More specifically, the external key management service 180 is configured to grant access to the customer data 120 (e.g., by providing access to the corresponding key 121) when the justification 204 satisfies a security policy 200 associated with the customer data 50 and the corresponding client-side cryptographic key 121. For instance, the security policy 200 may define at least one of a list of approved credentials 202 or a list of approved justifications 204 for accessing the customer data 50. Here, the security policy 200 may be satisfied when the justification 204 of the access request 302 matches a justification 204 included in the list of approved justifications 204 defined by the security policy 200. Additionally, the external key management service 180 may also require that the credential 202 of the requestor 20 included in the access request 302 matches a credential 202 included in the list of approved credentials 202 defined by the security policy in order for the security policy 200 to be satisfied. While the lists of approved credentials and justifications 202, 204 correspond to whitelists in the example security policy 200 of FIG. 2, security policies 200 may additionally or alternatively include blacklists defining unauthorized credentials and/or unauthorized justifications 202, 204, that when included in a corresponding access request 302, result in the security policy 200 to not be satisfied.

In some examples, the external key management service 180 provides an approved access token 310 to the AMS 300 when the external key management service 180 grants access to the customer data 50. The approved access token 310 may include the customer-side cryptographic key 121 or an identifier of the customer-side cryptographic key 121 for accessing the customer data 50 stored on the storage abstraction 200. In turn, the AMS 300 may use the cryptographic key 121 to decrypt the requested customer data 50 and provide the decrypted customer data 50 to the requestor device 120. Additionally, the AMS 300 is configured to transmit a corresponding result 320 to the client device 110 that indicates that the client-side cryptographic key 121 was accessed from the external key management system 150 for use in decrypting the customer data 120 for the requestor 20. Here, the result 320 may identify the access request 302 including the justification 204 and the credentials 202, the requested customer data 50, an indication that the access request was granted, and/or a timestamp of when the data 50 and/or the key 121 was accessed. Accordingly, the result 320 may serve as an audit log. In some examples, results 320 may be provided at predetermined time intervals or time intervals selected by the customer 10, wherein each result 320 includes an audit log of multiple access requests 302 received during the corresponding time interval.

On the other hand, when the external key management service 180 denies access to the customer data 50 (e.g., denies access to the corresponding client-side encryption key 121), the AMS 300 may provide an access denied response 350 to the requestor device 120 to inform the requestor 20 that access to the customer data 20 requested in the access request 302 is denied. In some examples, the AMS 300 sends the access denied response 350 after a predetermined period of time elapses without receiving an authorized access token 310 from the external key management service 180. In additional examples, the external key management service 180 informs the AMS 300 when the external key management service 180 denies access to the customer data 50. Additionally, the AMS 300 may transmit a corresponding result 320 to the client device 110 that indicates that the access request 302 was denied. Here, the result 320 informs the client device 110 that a requestor 20 attempted to access the customer data 120, but requestor's 20 access request 302 was denied. In this scenario, the result 320 indicating the denial of access to the customer data 50 identifies the access request 302 including the justification 204 and the credentials 202, the requested customer data 50, and a rational as to why access to the customer data is denied. For instance, the request 302 may be denied for having an invalid/unauthorized justification 204 and/or unauthorized credentials 202 (e.g., the justification 204 and/or credentials 202 are not listed in the security policy 200.

The external key management service 180 may deny access to the customer data 50 when the justification 204 of the access request 302 fails to satisfy the corresponding security policy 200. In some configurations, however, failing to satisfy the corresponding security policy 200 may not automatically result in denial of the access request 302. In these configurations, when the security policy 200 is not satisfied, the external key management service 180 may forward the access request 302 to the client device 110 to allow the customer 10 to ultimately decide to grant or deny access to the customer data 50. For instance, the customer 10 may review the credentials 202 and justification 204 provided in the access request 302 and decide to override the security policy 200 by instructing the external key management service 180 to provide the authorized access token 310 to the AMS 300.

In some examples, the external key management service 180 resides on the customer premises and communicates with the AMS 300 via the network 130. The external key management service 180 may execute on the client device 110 or on some other system/service in communication with the client device 110 and the AMS 300.

Figure 3A:
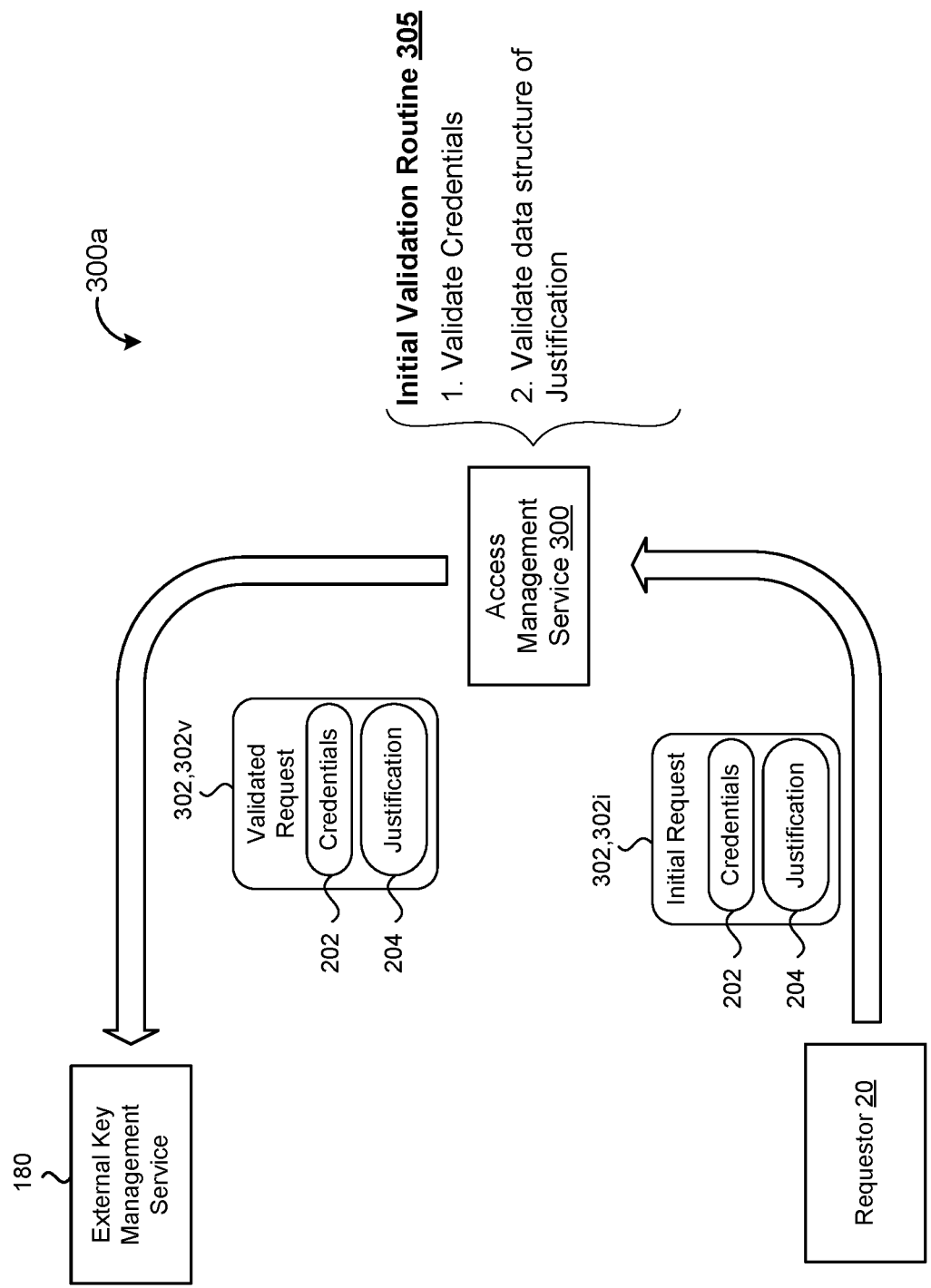
FIG. 3A is a schematic view of an access management service receiving and validating an access request requesting access to customer data stored on a storage abstraction.
Figure 3B:
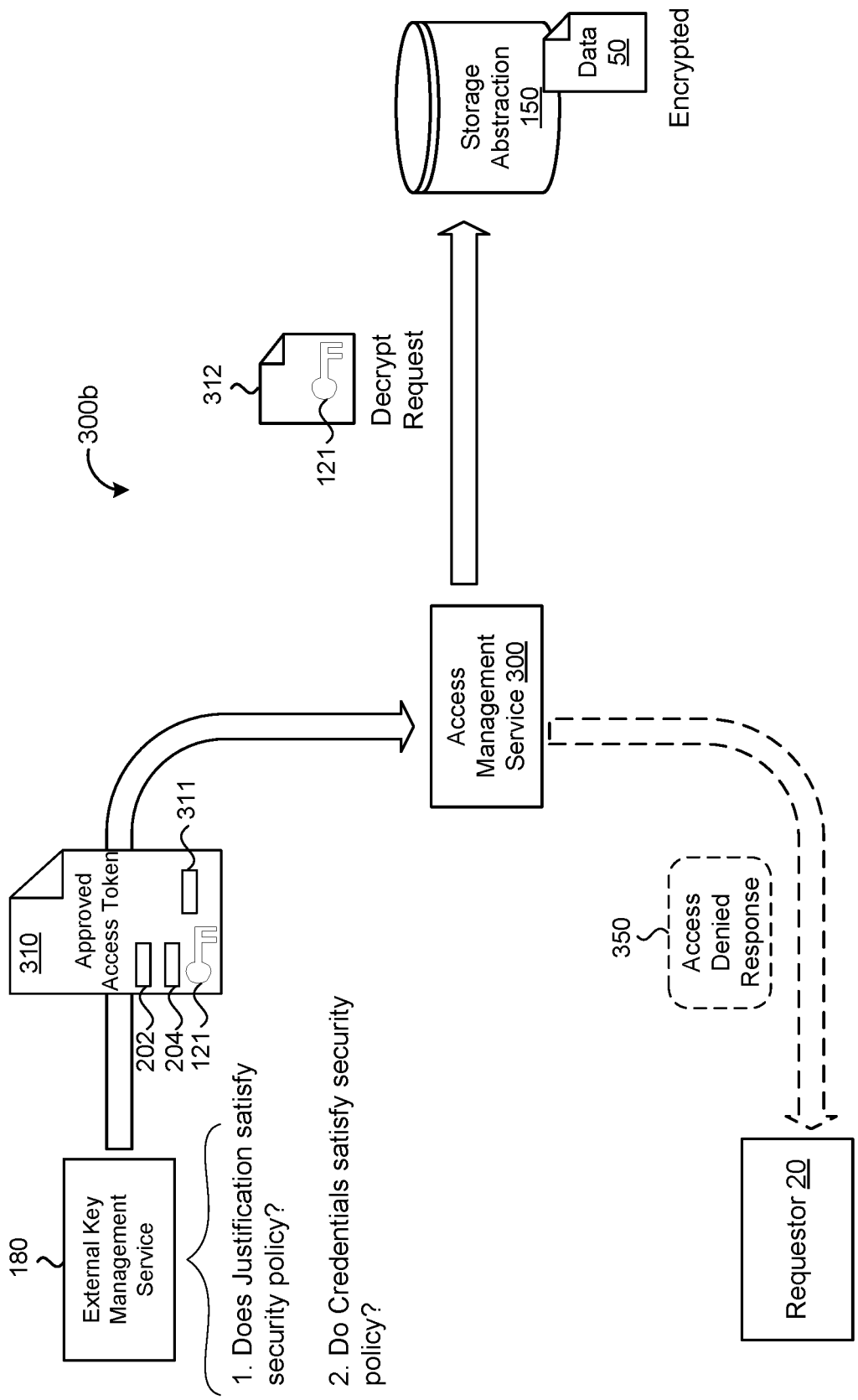
FIG. 3B is a schematic view of the access management service receiving an authorized access token for an external key management service and using the authorized access token to access the customer data stored on the storage abstraction.
Figure 3C:
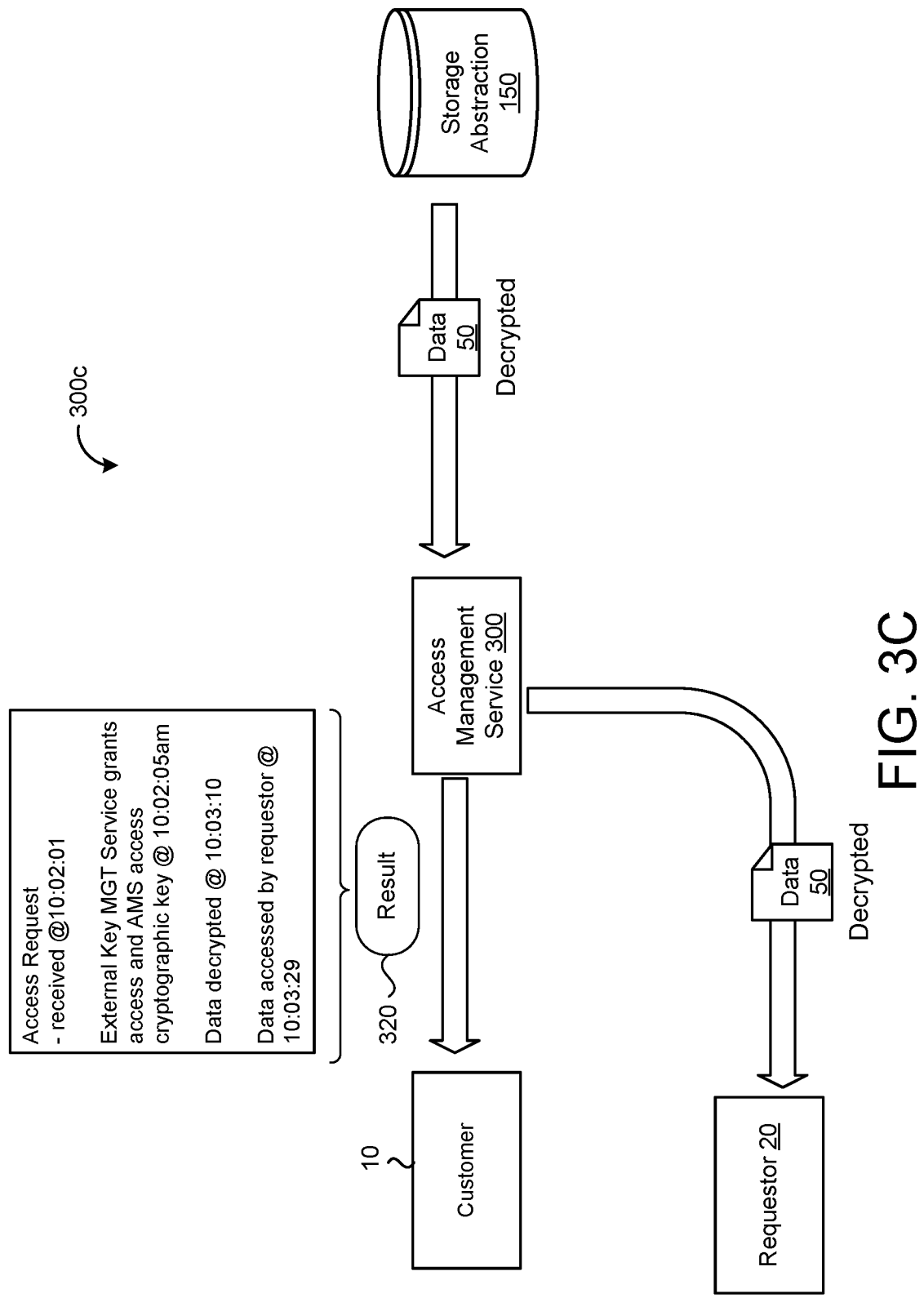
FIG. 3C is a schematic view of the access management service transmitting the customer data in decrypted form to a requestor.

FIGS. 3A-3C show schematic views 300a, 300b, 300c of an example AMS 300 validating an access request 302 received from a requestor device 120, receiving an authorized access token 310 from an external key management service 180 when the external key management service 180 grants access to customer data 50 requested in the access request 302, and accessing the customer data 50 stored on a storage abstraction 150 using the approved access token 310 received from the external key management service 180. Referring to FIG. 3A, the AMS 300 receives the access request 302 requesting access to the customer data 50 stored on the storage abstraction 150. The AMS 300 may receive the access request 302 from a requestor 20, such as an administrator of the remote system 140 or a third party. Here, the requestor 20 may use a requestor device 120 to transmit the access request 302 over the network 130 to the AMS 300. The requestor device 120 may execute an application programming interface (API) to generate and transmit the access request 302 to the AMS 300. In other scenarios, the requestor 20 corresponds to source code of a software application deployed by the customer 10 for execution on the remote system, whereby the source code requires access to the customer data 50 for running the software application. In these scenarios, the requestor device 120 may include a computing resource 144 executing the software application or a collection of resources 142 executing virtual machines or containers for executing the software application. The source code of the software application may provide multiple access requests 302 (e.g., sent using API calls) to the AMS 300 that each including corresponding credentials 202 and a corresponding justification 204. Accordingly, the access request 302 may include an API call, such as a remote procedure call (RPC), that specifies the customer data 50 and includes the credentials 202 (e.g., access role and/or domain address) of the requestor 20 and the justification 204 specifying a purpose/reason for requesting access to the customer data 50.

In the example shown, the access request 302, 302i received by the AMS 300 corresponds to an initial access request 302i and the AMS 300 executes an initial validation routine 305 to validate the justification 204 of the access request. Here, the routine 305 performs a justification check that first determines whether the initial access request 302i includes a justification 204, and when the request 302i includes the justification 204, validates the justification 204. If the routine 305 determines that the received access request 302 does not include a justification 204, the AMS 300 will deny the requestor 20 access to the customer data 50. If the routine 305 determines the access request 302 does include the justification 204, but determines that the justification 204 is invalid, the AMS 300 will deny the requestor 20 access to the customer data 50. In some examples, validating the justification 204 includes validating that a data structure of the justification 204 conforms to a specified data structure. In some examples, Virtual Machines (VMs) include remote-access interfaces, such as TELNET or secure shell (SSH). VMs may include other remote-access protocols and interfaces as well. The AMS 300 may ensure the VM remote-access interfaces provide a justification 204 with a specified data structure when sending access requests 302.

In some implementations, the initial validation routine 305 additionally validates the credentials 202 of the initial access request 302i. For instance, the routine 305 may perform an Identify and Access Management (IAM) check that validates the credentials 202. Here, validating the credentials 202 may include authenticating the credentials 202 and determining the credentials 202 are authorized to access the data 50. In these implementations, the IAM check may access a whitelist of authorized credentials (e.g., access roles, user identifiers, group identifiers, service identifiers, domain addresses) authorized to access the customer data 50 and/or access a blacklist of credentials not authorized to access the customer data 50. In some examples, the initial validation routine 305 accesses the security policy 200 associated with the customer data 50 to obtain the list of approved credentials 202 (and/or list of unauthorized credentials). If the routine 305 determines the credentials in the access request 302 are invalid, the AMS 300 will deny the requestor 20 access to the customer data 50.

After the initial validation routine 305 validates the justification 204 (and optionally validates the credentials 202) of the access request 302, the AMS 300 transmits a validated access request 302, 302v to the external key management service 180 associated with the customer 10. Here, the validated access request 302v provides assurances to the customer 10 that the CSP of the remote system 140 has validated the justification 204 and optionally the credentials 202 of the access request 302. For example, validating the credentials 202 provides assurances to the customer 10 and associated external key management service 180 that the identity of the requestor 20 is authorized and authenticated. Based on the justification 204 in the validated access request 302v, the external key management service 180 is configured to one of grant access to the customer data 50 or deny access to the customer data 50.

Referring to FIG. 3B, the AMS 300 receives an authorized access token 310 when the external key management service 180 grants access to the customer data 50. In some examples, the external key management service 180 grants access to the customer data 50 when the justification 204 of the access request 302 satisfies a security policy 200 associated with the customer data 50. For instance, the justification 204 of the access request 302 may satisfy the security policy 200 when the justification 204 matches a justification in an approved list of justifications 204 specified by the security policy 200. The service 180 may additionally require the credentials 202 of the access request 302 to satisfy the security policy 200 before granting access to the customer data 40. For instance, the credentials 202 of the access request 302 may satisfy the security policy 200 when the credentials 202 match credentials in an approved list of credentials 202 specified by the security policy 200. The approved access token 310 includes a customer-side cryptographic key 121 (e.g., CMEK) or an identifier of the customer-side cryptographic key 121 for accessing the customer data 50 stored on the storage abstraction 150. The approved access token 310 may further include the credentials 202 and/or the justification 204 included in the access request 302 for accessing the customer data 50.

In some implementations, the approved access token 310 (or specifically the cryptographic key 121) is bound by a predetermined time period 311 in which the approved access token 310 is valid. After receiving the approved access token 310, the AMS 300 may reject the approved access token 310 if a current time is outside the predetermined time period 311 specified by the approved access token 310. Accordingly, binding the validity of the approved access token 310 by the predetermined time period prevents the ability to access the customer data 120 at any and all times in the future.

With continued reference to FIG. 3B, the AMS 300 uses the client-side cryptographic key 121 accessed from the external key management service 180 to access the customer data 50 stored on the storage abstraction 150. Specifically, the AMS 300 may transmit a decrypt request 312 including the cryptographic key 121 to the storage abstraction 150 to decrypt the customer data 50 requested in the access request 302.

FIG. 3B also shows the AMS 300 configured to provide an access denied response 350 to the requestor 20 to inform the requestor 20 that access to the customer data 20 requested in the access request 302 is denied in scenarios such as when the AMS 300 is unable to validate the justification 202 (FIG. 3A), the external key management service 180 denies access to the customer data 50, or the approved access token 310 violates the predetermined time period 311 in which the token 310 is valid. In these scenarios, the AMS 300 may also provide a result 320 to the customer 10 to inform the customer that the requestor 20 attempted to access the customer data 20, but the request was denied. Optionally, the result 320 may provide rational as to why the request 302 was denied and/or a timestamp of when the access request 302 was received.

Referring to FIG. 3C, the AMS 300 retrieves the decrypted customer data 50 from the storage abstraction 150 and transmits the decrypted customer data 50 to the requestor 20. Additionally, the AMS 300 transmits a corresponding result 320 to the customer 10 to inform the customer 10 that the access request 302 was received from the requestor 20 and the external key management service 180 granted the requestor 20 access to the requested customer data 10 stored on the storage abstraction 150. The result 320 may include one or more timestamps for indicating when the access request was received, when the external key management service 180 granted access to the customer data 120 and/or when the AMS 300 accessed the cryptographic key 121, when the customer data 50 was decrypted, and when the requestor 20 accessed the decrypted customer data 50.

Figure 4:
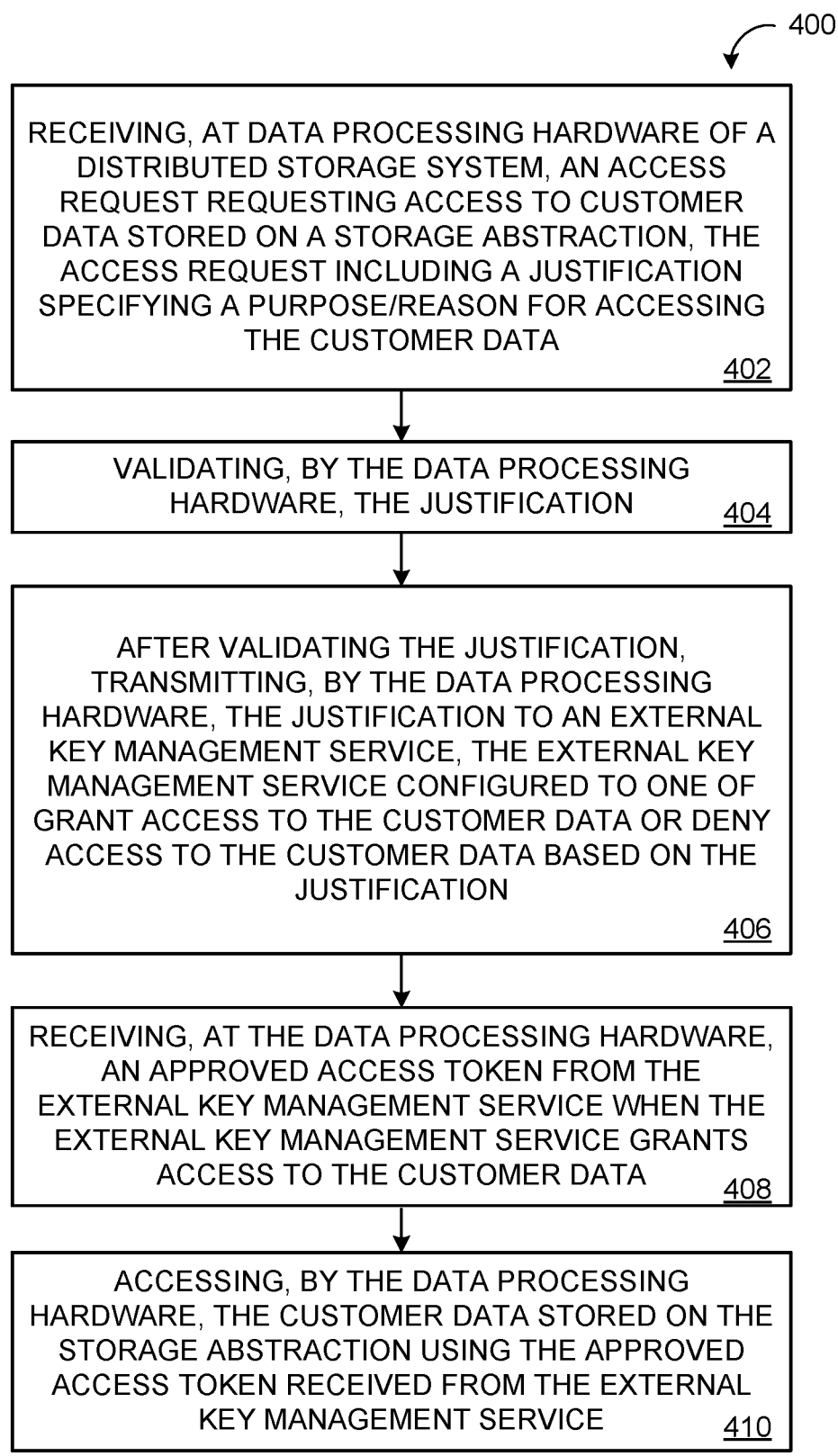
FIG. 4 is an example arrangement of operations for a method of managing access to customer data stored on a storage abstraction.

FIG. 4 is a flowchart of an example arrangement of operations for a method 400 of accessing customer data 50 stored on a storage abstraction 150. At operation 402, the method 400 includes, receiving, at data processing hardware 144, an access request 302 requesting access to customer data 50 stored on a storage abstraction 200 in communication with the data processing hardware 142. The access request 302 includes a justification 202 that specifies a purpose/reason for requesting access to the customer data 50. At operation 404, the method 400 includes validating, by the data processing hardware 144, the justification 202. In some examples, validating the justification 202 includes validating a data structure of the justification 202.

After validating the justification 202, the method 400 includes, at operation 406, transmitting, by the data processing hardware 144, the justification 202 to an external key management service 180 associated with a customer 10 of the customer data 50 and in communication with the data processing hardware 144. The external key management service 180 is configured to one of grant access to the customer data 50 or deny access to the customer data 50 based on the justification 202. In some examples, the external key management service 180 is configured to grant access to the customer data 50 when the justification 202 satisfies a security policy 200 associated with the customer data 50. For instance, the security policy 200 may define a list of approved purposes/reasons for accessing the customer data 50 and the external key management service 180 may grant access to the customer data 50 when the justification 202 includes a purposes/reason that matches one of the approved purposes/reasons in the list of approved purposes/reasons.

At operation 408, the method 400 includes receiving, at the data processing hardware 144, an approved access token 310 from the external key management service 180 when the external key management service 180 grants access to the customer data 50. The token 310 may include a client-side cryptographic key 121 or an identifier of the cryptographic key 121 for accessing the customer data 50 stored on the storage abstraction 150. In some examples, the token 310 is valid for a predetermined time period. In these examples, the data processing hardware 144 rejects access to the customer data 50 stored on the storage abstraction 150 when a current time is outside the predetermined time period. At operation 410, the method 400 includes accessing, by the data processing hardware 144, the customer data 50 stored on the storage abstraction 150 using the approved access token received from the external key management service 180.

Figure 5:
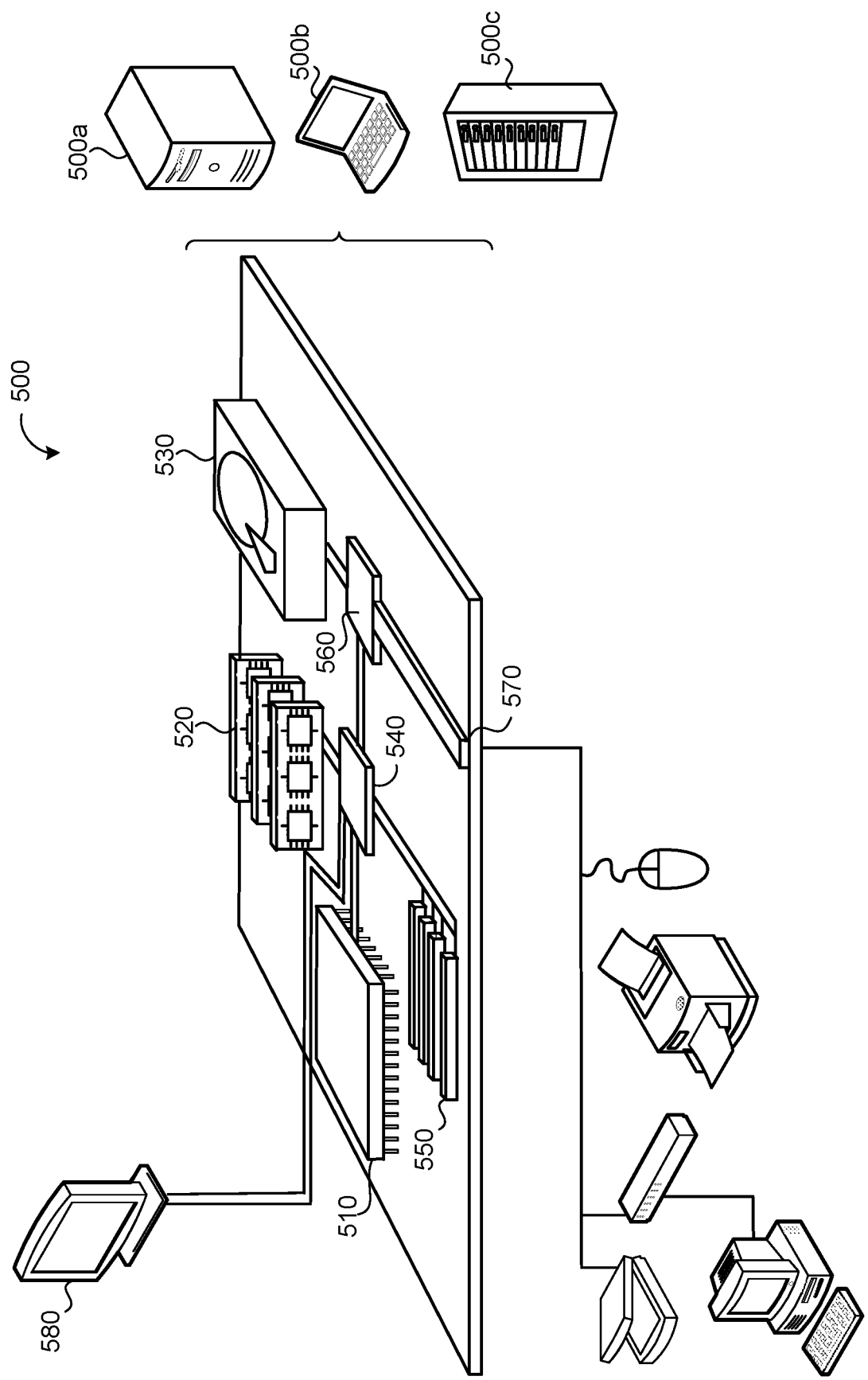
FIG. 5 is a schematic view of an exemplary computing device.

FIG. 5 is schematic view of an example computing device 500 that may be used to implement the systems and methods (e.g., the method 500) described in this document. The computing device 500 is intended to represent various forms of digital computers, such as laptops, desktops, workstations, personal digital assistants, mobile computing devices, wearable computing devices (e.g., headsets and/or watches), servers, blade servers, mainframes, and other appropriate computers. The components shown here, their connections and relationships, and their functions, are meant to be exemplary only, and are not meant to limit implementations described and/or claimed in this document.

The computing device 500 includes a processor 510 (e.g., data processing hardware 144), memory 520 (e.g., memory hardware 146), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid-state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high-speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving an access request requesting access to data, the access request comprising credentials associated with a requestor of the access request and a justification justifying access to the data;
   validating a data structure of the justification;
   after validating the data structure of the justification, transmitting, to an external key management service, the justification and the credentials;
   receiving, from the external key management service, an access token indicating that:
   the justification comprises an approved justification approved by the external key management service; and
   the credentials comprise approved credentials approved by the external key management service; and
   accessing, using the access token received from the external key management service, the data.

2. The method of claim 1, wherein the access token comprises a customer-side cryptographic key or an identifier of the customer-side cryptographic key for accessing the data.

3. The method of claim 2, wherein accessing the data comprises decrypting the data using the customer-side cryptographic key.

4. The method of claim 1, wherein the access token is valid for a predetermined time period.

5. The method of claim 1, wherein the data processing hardware is prevented from accessing the data without the access token.

6. The method of claim 1, wherein the credentials associated with the requestor of the access request comprises:
   a user identifier;
   a group identifier;
   a service identifier;
   an access role; or
   a domain address.

7. The method of claim 6, wherein:
   the external key management service comprises a list of approved credentials for accessing the data; and
   the external key management service is configured to transmit the access token when the credentials of the access request match one of the approved credentials in the list of approved credentials.

8. The method of claim 1, wherein the external key management service is configured to transmit the access token when the justification satisfies a security policy associated with the data.

9. The method of claim 8, wherein the security policy defines at least one of:
   a list of approved credentials for accessing the data; or
   a list of approved justifications for accessing the data.

10. The method of claim 1, wherein the operations further comprise, after accessing the data, transmitting a result to a client device associated with an owner of the data, the result informing the owner that the data was accessed.

11. A system comprising:
    data processing hardware; and
    memory hardware in communication with the data processing hardware, the memory hardware storing instructions that when executed on the data processing hardware cause the data processing hardware to perform operations comprising:
    receiving an access request requesting access to data, the access request comprising credentials associated with a requestor of the access request and a justification justifying access to the data;
    validating a data structure of the justification;
    after validating the data structure of the justification, transmitting, to an external key management service engine, the justification and the credentials;
    receiving, from the external key management service engine, an access token indicating that:
    the justification comprises an approved justification approved by the external key management service engine; and
    the credentials comprise approved credentials approved by the external key management service engine; and
    accessing, using the access token received from the external key management service engine, the data.

12. The system of claim 11, wherein the access token comprises a customer-side cryptographic key or an identifier of the customer-side cryptographic key for accessing the data.

13. The system of claim 12, wherein accessing the data comprises decrypting the data using the customer-side cryptographic key.

14. The system of claim 11, wherein the access token is valid for a predetermined time period.

15. The system of claim 11, wherein the data processing hardware is prevented from accessing the data without the access token.

16. The system of claim 11, wherein the credentials associated with the requestor of the access request comprises:
- a user identifier;
- a group identifier;
- a service identifier;
- an access role; or
- a domain address.

17. The system of claim 16, wherein: the external key management service engine comprises a list of approved credentials for accessing the data; and the external key management service engine is configured to transmit the access token when the credentials of the access request match one of the approved credentials in the list of approved credentials.

18. The system of claim 11, wherein the external key management service engine is configured to transmit the access token when the justification satisfies a security policy associated with the data.

19. The system of claim 18, wherein the security policy defines at least one of:
- a list of approved credentials for accessing the data; or
- a list of approved justifications for accessing the data.

20. The system of claim 11, wherein the operations further comprise, after accessing the data, transmitting a result to a client device associated with an owner of the data, the result informing the owner that the data was accessed.

* * * * *